United States Patent [19]

Chaborski

[11] 4,181,431

[45] Jan. 1, 1980

[54] LASER DISTANCE MEASURING APPARATUS

[75] Inventor: Hoiko Chaborski, Munich, Fed. Rep. of Germany

[73] Assignee: MITEC-Moderne Industrietechnik GmbH, Ottobrunn, Fed. Rep. of Germany

[21] Appl. No.: 948,876

[22] Filed: Oct. 5, 1978

Related U.S. Application Data

[63] Continuation-in-part of Ser. No. 816,699, Jul. 18, 1977, Pat. No. 4,139,301.

[30] Foreign Application Priority Data

Jul. 31, 1976 [DE] Fed. Rep. of Germany ....... 2634627

[51] Int. Cl.² .............................................. G01C 3/08
[52] U.S. Cl. ..................................... 356/5; 343/12 R
[58] Field of Search ........................ 356/5; 343/12 R; 307/320

[56] References Cited

U.S. PATENT DOCUMENTS

| | | | |
|---|---|---|---|
| 3,813,165 | 5/1974 | Hines et al. | 356/5 |
| 3,869,207 | 3/1975 | Hermet et al. | 356/5 |
| 3,900,261 | 8/1975 | Wingate | 356/5 |
| 3,992,615 | 11/1976 | Bennett et al. | 356/5 |

Primary Examiner—S. C. Buczinski
Attorney, Agent, or Firm—W. G. Fasse; D. F. Gould

[57] ABSTRACT

The present apparatus measures distance with the aid of a laser beam. A reference channel provides a signal in response to the emission of a laser beam. A measuring channel provides a stop signal. Both channels are substantially identical and each includes an input circuit with a light sensitive diode having a barrier layer capacity. The input circuit is so arranged that the barrier layer capacity is connected in parallel to a parallel resonance circuit which is triggered by its respective light sensitive diode to generate a damped sine wave. In the reference channel the first passage through zero of the damped sine wave is detected. In the measuring channel the second passage through zero of the damped sine wave is detected. Thus, the time significant impulse flanks are precisely determined.

4 Claims, 4 Drawing Figures

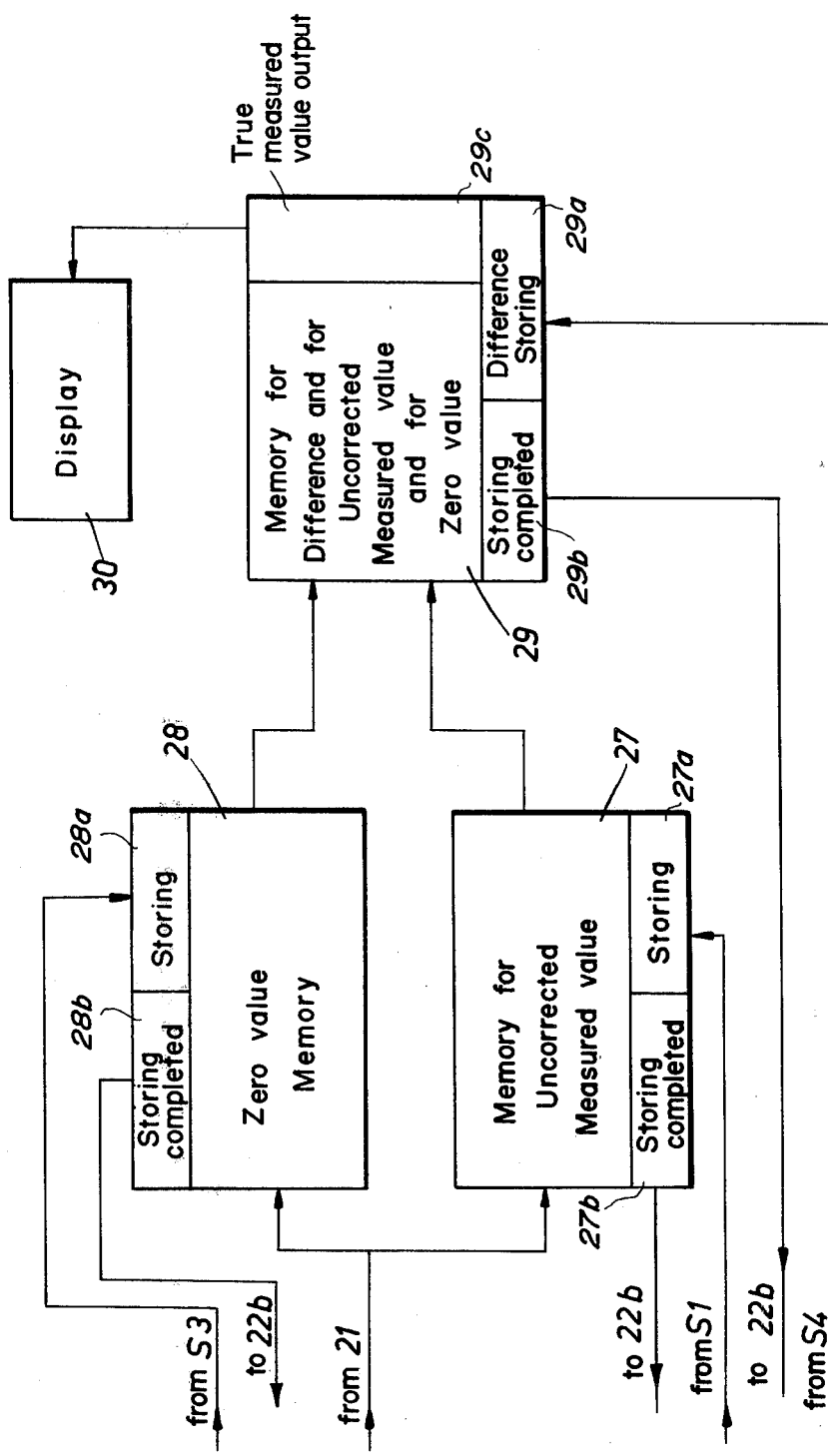

LASER DISTANCE MEASURING APPARATUS

CROSS REFERENCE TO RELATED APPLICATIONS

The present application is a continuation-in-part application of my copending application U.S. Ser. No. 816,699, filed: July 18, 1977, now U.S. Pat. No. 4,139,301.

BACKGROUND OF THE INVENTION

The invention relates to a laser distance measuring device which employs the principle of transit time or delayed time of a light impulse to measure distance by means of two channels. One channel, the so-called reference channel, serves for obtaining a start signal. The other channel, the so-called measuring channel, serves for obtaining the stop signal. Each channel has a diode input receiver circuit comprising a light sensitive diode connected in series with its operating impedance in the form of a parallel resonance circuit which is so arranged that in addition to the inductance coil and an external capacity the barrier layer capacity of the receiver light sensitive diode is also connected in parallel to the parallel resonance circuit as described in my above copending application.

Prior art laser distance measuring devices comprise but one receiver channel. Thus, it is necessary that the start of the time measuring must be derived from the electrical triggering of the laser impulse generation. However, the reaction time for generating such a start impulse is not well defined and subject to substantial variations or drifting. Furthermore, due to the direct electrical coupling between the transmitter and the receiver the highly sensitive receiver is subject to substantial interferences caused by the high current gradient of the laser impulse generation, whereby the sensitivity of the apparatus, or rather of the receiver, is reduced.

OBJECTS OF THE INVENTION

In view of the above, it is the aim of the invention to achieve the following objects singly or in combination:

to provide for a galvanic separation between the transmitter and receiver in a laser distance measuring apparatus as described above;

to overcome the above described disadvantages of single channel prior art laser devices, more specifically, to avoid the reduction of the input sensitivity of the receiver;

to avoid that the illumination or brightness of the environment in which the distance measuring laser apparatus is used, influences the measured result;

to avoid the need for optical filters which were necessary heretofore in single channel laser distance measuring devices;

to eliminate the effects of differing drifting and aging in the two measuring channels;

to avoid an overloading of the measuring channel amplifier where the target provides a strong reflected signal; and to make sure that the measuring takes place in the linear range of the working characteristic of the amplifier.

SUMMARY OF THE INVENTION

According to the invention there is provided a laser distance measuring apparatus wherein the laser impulse emitted by the transmitter triggers the reference channel and the measuring channel in an optical manner. For obtaining the time significant signal flanks, the first zero passage of the sine wave in the reference channel is detected, whereby the stray light of the transmitter lens triggers said sine wave or oscillation. Similarly, also for obtaining the time significant signal flanks the second zero passage of the sine wave in the measuring channel is detected, whereby the sine wave in the measuring channel is triggered by the laser impulse reflected by the target.

The just summarized features eliminate the above mentioned disadvantages of the prior art and achieve the mentioned objects. Particularly, due to the use of parallel resonance circuits for the working impedance of the receiver light sensitive diodes, the optical filters required heretofore are not necessary anymore.

BRIEF FIGURE DESCRIPTION

In order that the invention may be clearly understood, it will now be described, by way of example, with reference to the accompanying drawings, wherein:

FIG. 3 shows the various memory means as well as the display also in block form; and FIG. 4 shows the damped sine waves which are generated in the input circuits of the measuring channel and of the reference channel.

DETAILED DESCRIPTION OF PREFERRED EXAMPLE EMBODIMENTS

Figure 1:
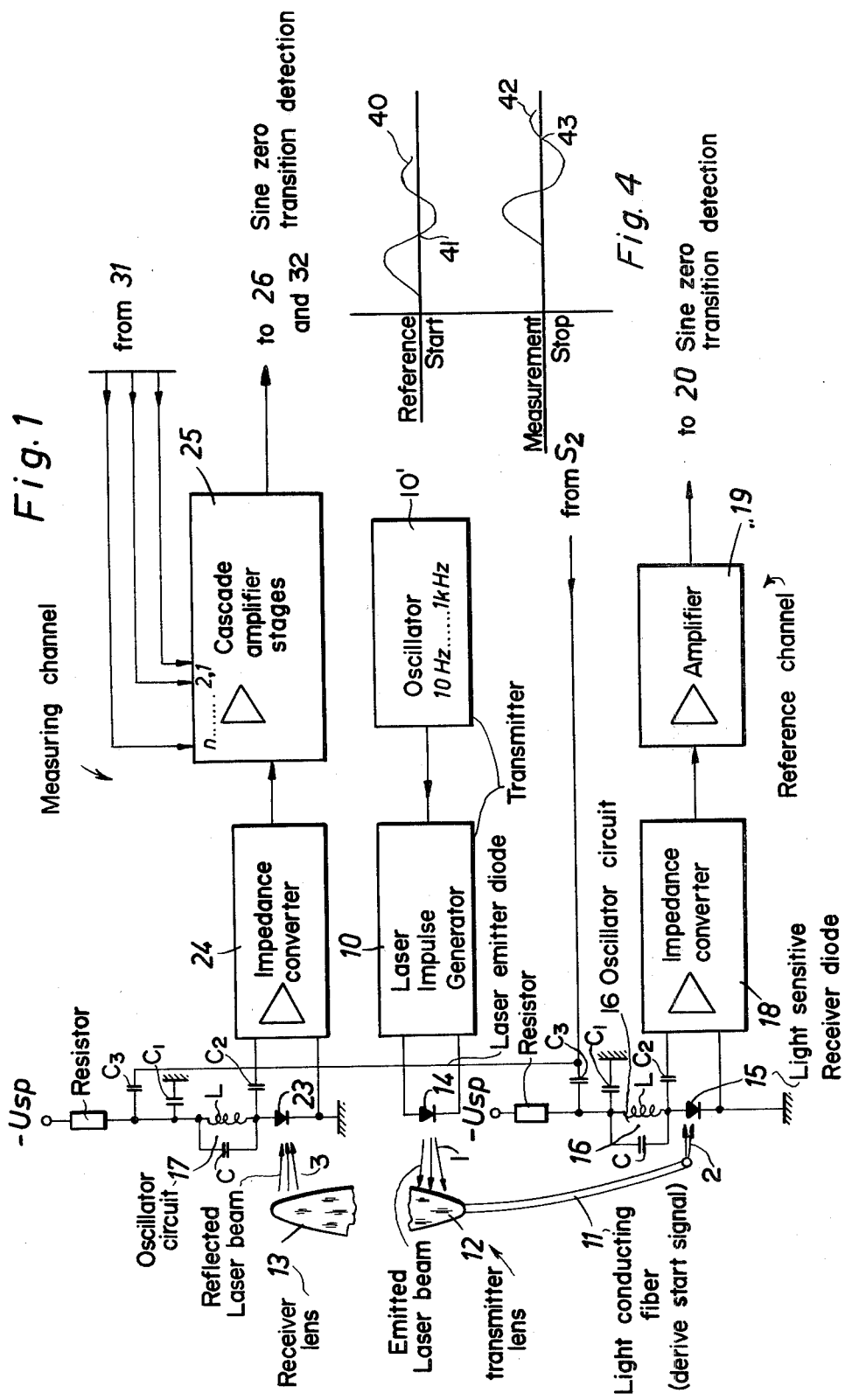
FIG. 1 illustrates in block form the laser transmitter as well as the input end of the measuring channel and the input end of the reference channel.

Referring to FIG. 1 a laser generator 10 including an oscillator 10' generates through its laser emitter diode 14 a laser beam or impulse 1 which is transmitted through the transmitter lens 12 onto a reflecting target not shown. As the emitted laser impulse or beam 1 passes through the transmitter lens 12 a small proportion 2 of stray light is reflected and conducted through a light conducting channel 11 such as a bundle of optical fibers, onto the light sensitive receiver diode 15 of the reference channel.

Similarly, the laser beam 3 which is reflected by the target, is focused through the receiver lens 13 onto the light sensitive receiver input diode 23 of the measuring channel.

Both, the light sensitive input diode 15 and the light sensitive input diode 23 are operatively connected to a respective parallel resonance oscillator circuit 16 and 17 which are of identical construction. Each of the parallel resonance circuits 16 and 17 comprises an inductance coil L and a capacitor C. Due to the further capacitor $C_1$ which couples one end of the resonator circuit to ground in an AC manner, the barrier layer capacity of the respective light sensitive diodes 15, 23 is also connected in parallel to the respective parallel oscillator circuit 16, 17. A further capacitor $C_2$ couples the respective input circuit to the impedance converter 18 of the reference channel or to the impedance converter 24 of the measuring channel. In addition, each input circuit is connected through a resistor to a working voltage supply source $-U_{sp}$. Each input circuit is further connected through a respective capacitor $C_3$ to the output $S_2$ of the control circuit 22 as will be described in more detail below.

Figure 2:
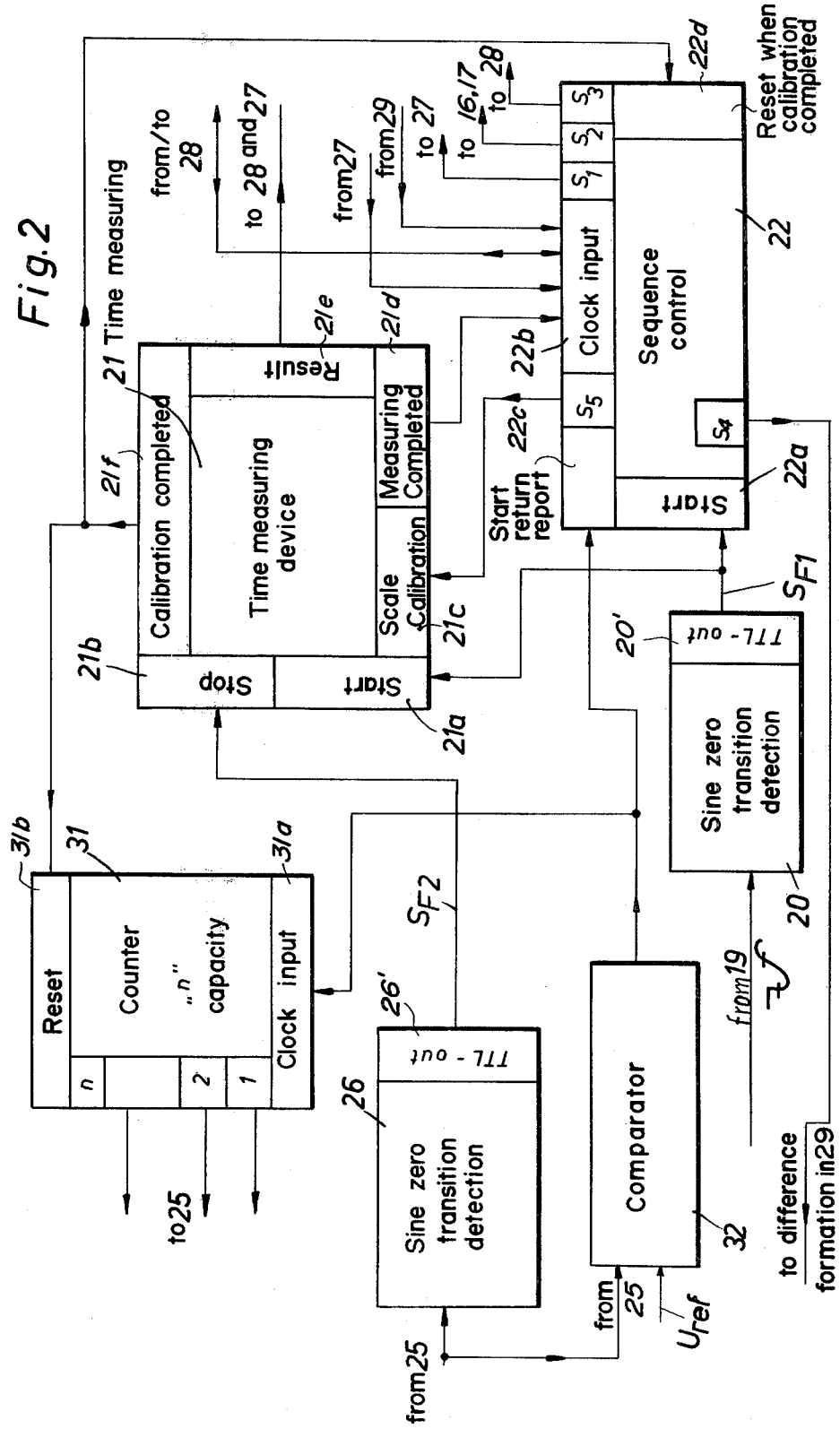
FIG. 2 is a block diagram of further components of the reference and measuring channels as well as of the sequence control and the time measuring means.

When the light sensitive diode 15 receives the light portion 2, it triggers the resonance circuit 16 to deliver a damped sine oscillation to the impedance converter 18, the output of which is connected to an amplifier 19 which in turn is connected with its output to the sine zero transition detector 20 shown in FIG. 2. The details of the detector are shown in the above mentioned copending application. The transistor-transistor logic output 20' of the detector 20 provides an output signal $S_{F1}$ which has an inherent time delay and indicates that the laser impulse has just left the transmitter lens 12 toward the target. Thus, the signal $S_{F1}$ is supplied to the start input 21a of the time measuring device 21. The signal $S_{F1}$ is also supplied to the start input 22a of the sequence control unit 22 which controls the measuring and calibrating to be described.

Subsequently, after the time has lapsed which is required for the laser impulse to reach the target and for the reflected laser beam 3 to return through the receiver lens 13 to the receiver diode 23 of the measuring channel, the reflected laser beam causes the light sensitive receiver diode 23 to trigger the parallel resonance oscillator circuit 17 in the same manner as the stray light has triggered the resonance circuit 16 as described above. The output of the oscillator circuit 17 is also supplied to an impedance converter 24, the output of which in turn is connected to a multi stage amplifier 25. The amplifier 25 comprises "n" number of stages which are selected, for example, through a comparator 32 and counter 31 to be described. The output of the amplifier 25 is supplied to the sine zero transition detection circuit 26 shown in FIG. 2. FIG. 4 illustrates the two sine waves generated by the oscillator 16 and the oscillator 17. Thus, the oscillator 16 in the reference channel produces the damped sine wave 40 and the oscillator 17 in the measuring channel produces the sine wave 42. As described in the parent application mentioned above, in the reference channel the first zero passage 41 is detected whereas in the measuring channel the second zero passage 43 is detected. This feature has the advantage that any drifting between the measuring channel and the reference channel relative to each other cannot cause the time significant signal of the measuring channel to occur prior to the occurrence of the time significant signal flank of the reference channel when the distance measured is zero. Thus, the apparatus may be used for measuring extremely short distances and a failure in this respect is impossible.

At the output of the zero transition detection circuit 26 of the measuring channel, the time significant signal flank $S_{F2}$ is supplied to the stop input 21b of the time measuring device 21. Shortly after receiving the stop input signal $S_{F2}$ the time measuring unit 21 produces the signal "measuring completed" at its respective output 21d, whereby the sequence control unit 22 receives a stepping pulse at its input 22b to make a further step. Thus, the result of the time measuring is stored in the memory 27 for the uncorrected measured value since the memory 27 receives a stepping pulse from the stepping position $S_1$ of the sequence control 22. The information or measured value is considered uncorrected at this point because the time significant signal flanks $S_{F1}$ and $S_{F2}$ exhibit a time delay which is inherent in the reference channel and in the measuring channel. This time delay depends primarily on the different sine zero transition detection as described above. The zero transition in the reference channel is the first zero transition whereas in the measuring channel it is the second zero transition which is detected.

Immediately after the application of the stepping signal $S_1$ to the storing input 27a of the memory 27 the latter provides at its output 27b a signal which signifies the completion of the storing and such signal is returned to the input 22b of the sequence control 22, thereby causing the output of the second stepping signal $S_2$ which is simultaneously supplied to both oscillator circuits 16 and 17 through the respective capacitors $C_3$, whereby both oscillator circuits 16, 17 are simultaneously triggered and again time significant signal flanks are derived as described above. The same time measuring device 21 is started and stopped in the same manner as if the oscillator circuits 16 and 17 had been optically triggered. The signal measuring completed from the output 21d of the time measuring unit 21 is again supplied to the stepping input 22b of the sequence control 22, thereby providing the step $S_3$. The signal which signifies the step $S_3$ is supplied to the storing input 28a of the second memory 28 whereby the second time measurement is stored in the second memory 28. Thus, the second memory 28 stores a value which corresponds to the different propagation time between the reference channel and the measuring channel.

This value must be deducted from the uncorrected measured value obtained after the channels were optically triggered as described above. After such deduction the result signifies the true measured value. For this purpose the memory 28 provides an output signal at its output 28b which signifies the completion of the storing at the second zero passage. This signal is supplied to the stepping input 22b of the sequence control 22 which thus provides a further stepping signal $S_4$ which is supplied to the difference storing input 29a of the difference memory 29. The difference memory 29 forms the difference between the uncorrected time measurement and the correction time measurement to thereby provide at its output 29c the true measured value which is supplied to a display device 30. The true measured value may also be used for control purposes or any other evaluation.

Due to the fact that the two time measurements follow each other immediately, whereby in the one instance the two oscillating circuits 16 and 17 are triggered optically; whereas in the other instance these oscillating circuits are triggered electrically, any different drifting and aging of the two channels and of the time measuring device 21 are substantially eliminated.

When the difference formation and storing in the difference memory 29 is completed an output signal is provided at the storing completed output 29b of the memory 29 and this signal is also supplied to the stepping input 22b of the sequence control 22 to provide the next stepping signal $S_5$ which is supplied to the input 21c of the time measuring device 21 to thereby cause a scale calibration in the time measuring device 21. Upon completion of the scale calibration the time measuring device 21 provides at its output 21f a signal which signifies the completion of the calibration. This signal is supplied to the reset input 22d of the sequence control 22, whereby the latter is reset to zero. The signal "calibration completed" is also supplied to the reset input 31b of a counter 31 thereby resetting this counter to zero.

The counter 31 is used for selecting the amplification factor in the cascade amplifier 25 of the measuring channel. The counter 31 has a clock input 31a connected to the output of a comparator 32 which in turn is connected with one input to a reference voltage $U_{ref}$ and with its other input to the output of the amplifier 25. The comparator 32 and the counter 31 make certain that the amplifier 25 is not overloaded if a particular target should reflect a particularly strong signal. For this purpose the amplitude at the output of the amplifer 25 is compared in the comparator 32 with the reference voltage $U_{ref}$. This reference voltage is selected in such a manner that an amplitude of the sine wave generated by the circuit 17 and which is at least as large as the reference voltage, will not overload the amplifier 25 if the amplification factor is adjusted accordingly through the counter 31. Thus, the measuring will always take place in the linear range of the operating or working curve of the amplifier 25.

If the amplitude of the sine signal exceeds the adjusted value of the reference voltage $U_{ref}$, the comparator 32 will switch the counter 31 to a further step, whereby simultaneously the amplifier 25 is switched to another stage. Simultaneously, the comparator 32 supplies a cancellation signal to the input 22c of the sequence control 22 whereby the instruction to the measuring device 21 is cancelled so that no storing of a newly measured value takes place at this time. However, the previously measured value remains stored. If now the next laser impulse is received, the just described operation is repeated if the sine wave signal at the input of the comparator 32 exceeds the reference voltage $U_{ref}$ and the amplification factor of the measuring channel amplifier 25 is further reduced until the amplitude of the sine signal from the oscillator circuit 17 does not exceed the reference voltage. Only after this check which makes sure that the amplifier 25 works in a linear range of its operational characteristic curve, is it possible to obtain the next true measured value as described above.

The present invention has been reduced to practice by using the following conventional shelf items:

| Reference Number | ITEM | Manufacturer | Model Number |
|---|---|---|---|
| 10 | laser impulse generator | MITEC-GmbH Munich, Germany | Typ 1001 A |
| 10' | oscillator | Texas-Instruments USA | 2x74LS123 |
| 11 | optical fiber bundle | Schott-Germany | |
| 12 | transmitter lens | MITEC-GmbH | Typ L1 1001 A |
| 13 | receiver lens | MITEC-GmbH | Typ L2 1001 A |
| 14 | laser emitter diode | Laser Diode Laboratories USA | LD 167 |
| 15,23 | light sensitive receiver diodes | Siemens- Munich, Germany | BPX65 |
| 16,17 | parallel resonant circuits | L = 10 μH C = 47 pF C1 = 10nF C2 = 10nF C3 = 5pF | |
| 18,24 | impedance converter | National Semiconductor USA | LH 0002 |
| 19 | amplifier | Silicon-General USA | 733 |
| 20,26 20',26' | zero transition detector TTL - OUTPUT | MITEC-GmbH | TD 1 -1001 A |
| 21 | time measuring | MITEC-GmbH | TD 1a, 6 -1001 A |
| 21a | start | Texas-Instruments USA | TM-21-1001 A |
| 21b | stop | " | TM-21-1001 B |
| 21c | scale calibration | MITEC-GmbH | TM-21c-1001A |
| 21d | measuring completed | Texas-Instruments USA | Texas Instruments 74LS123 |
| 21e | result ouput | Datel Systems USA | SHM-IC-1 |
| 21f | calibration completed | Texas Instruments, USA | 74LS123 |
| 22 | sequence control | Motorola, USA | MC14017 |
| 22a | start | " | " |
| 22b | clock pulse inputs | " | " |
| 22c | start return | " | " |
| 22d | reset | " | " |
| 25 | cascade amplifier stages | Silicon-General & Motorola, USA | 733+MC14016 |
| 27 | memory | Analog-Devices, USA | Sample/Hold AD582 |
| 27a | memory storing input | " | " |
| 27b | memory output storing completed | " | " |
| 28 | memory | " | AD582 |
| 28a | memory storing input | " | " |
| 28b | memory output storing completed | " | " |
| 29 | memory | Analog Devices, USA | AD582 |
| 29a | storing completed output | " | " |
| 29b | difference storing input | " | " |
| 29c | measured value output | " | " |
| 30 | display | Datamodul, USA | LCD; Typ: 34D5R02 |
| 31 | 1 to U counter | Texas Instruments, USA | 74LS93 |
| 31a | clock input | " | " |
| 31b | reset input | " | " |
| 32 | comparator | Advanced Microdevices, USA | AM 686 |

Although the invention has been described with reference to specific example embodiments, it is to be understood that it is intended to cover all modifications and equivalents within the scope of the appended claims.

What is claimed is:

1. A distance measuring apparatus using the transit time of a light impulse to a target and back, comprising reference channel means for providing a starting signal and measuring channel means for providing a stop signal, wherein each of said channels comprises receiver input circuit means, each receiver input circuit means comprising respective light sensitive diode means including a respective barrier layer capacity and working impedance means operatively connected to the respective light sensitive diode means, said working impedance means comprising a parallel resonance circuit including an inductance coil and external capacity means and means operatively connecting said barrier layer capacity of the respective light sensitive diode means in parallel to said parallel resonance circuit, said apparatus further comprising light beam generator means, first optical means for directing light from said light beam generator means onto said light sensitive diode means of the input circuit means of the reference channel means, second optical means for directing light returned from said target onto said light sensitive diode means of the input circuit means of the measuring channel means whereby said light sensitive diode means are optically triggered to generate respective sine waves in the respective parallel resonance circuit, first means for detecting the first zero passage of the sine wave in said reference channel means, and second means for detecting the second zero passage of the sine wave in said measuring channel means.

2. The apparatus of claim 1, wherein said first optical means comprise transmitter lens means and optical light channel means arranged to convey a stray light proportion of light received by said transmitter lens means, onto said light sensitive diode means of said input circuit means of said reference channel means, and wherein said second optical means comprise receiver lens means arranged to convey target reflected light onto said light sensitive diode means of the input circuit means of the measuring channel means.

3. The apparatus of claim 1, wherein said light channel means comprise optical fiber means.

4. The apparatus of claim 1, wherein said reference channel means and said measuring channel means are substantially identical to each other in structure.

* * * * *